Nov. 17, 1959  F. G. TURPIN, JR., ET AL  2,913,402
PREVENTION OF CATALYST LOSS IN THE REGENERATION OF
MOLYBDENUM OXIDE HYDROFORMING CATALYSTS
Filed Jan. 3, 1956
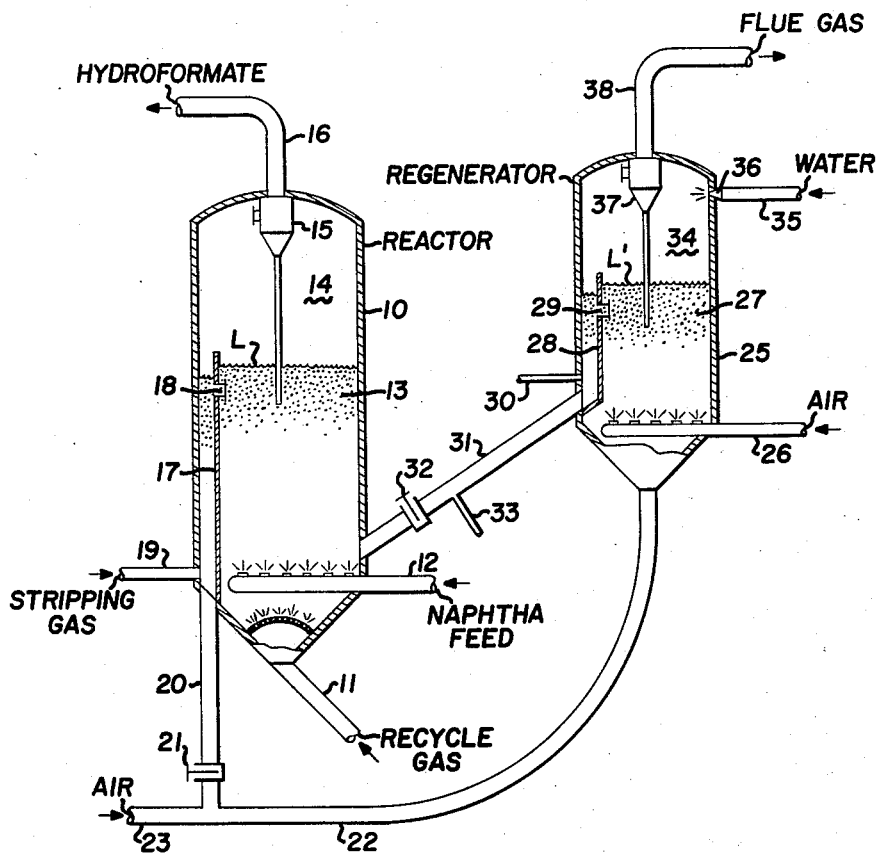
Frank G. Turpin, Jr.
Kenneth E. Draeger    Inventors
Leslie M. Addison
By *H. M. Feyrer* Attorney

United States Patent Office 2,913,402
Patented Nov. 17, 1959

2,913,402

PREVENTION OF CATALYST LOSS IN THE REGENERATION OF MOLYBDENUM OXIDE HYDROFORMING CATALYSTS

Frank George Turpin, Jr., Kenneth Earl Draeger, and Leslie Mandeville Addison, Baton Rouge, La., assignors to Esso Research and Engineering Company, a corporation of Delaware Application January 3, 1956, Serial No. 556,980

4 Claims. (Cl. 208—136)

The present invention pertains to fluid catalytic processes and particularly to the hydroforming of hydrocarbon fractions boiling in the naphtha or motor gasoline boiling range in contact with molybdenum oxide on alumina supports in fluidized solids reactor systems.

The fluidized solids technique has been widely adopted for a variety of non-catalytic and catalytic reactions, especially for the conversion of hydrocarbons such as in catalytic cracking, reforming, hydroforming or the like because of the advantages offered thereby of continuity of operation, uniformity of temperatures in the reaction and regeneration zones and the facility with which control of all phases of the process is achieved. An important advantage of the fluidized solids technique is the fact that the finely divided solid catalyst particles can be used to carry heat from the regeneration zone into the reaction zone.

On the basis of extensive laboratory scale, pilot plant scale as well as in commercial size fluid hydroforming units of about 20,000 barrels per day capacity it has been well established that the optimum molybdenum concentration on the catalyst is at about 10 weight percent $MoO_3$. These tests have shown that larger as well as smaller amounts of molybdenum produce inferior results. Unfortunately, during commercial operation the molybdenum content of the fluid molybdenum oxide catalyst has been found to decrease steadily with age. This presents a very serious problem and ultimately results in inferior activity and product yield structure.

It is the object of this invention to provide the art with an improved process for hydroforming naphtha fraction in contact with molybdenum oxide on alumina catalysts in accordance with the fluidized solids technique.

It is also the object of this invention to provide a process for hydroforming naphthas in contact with molybdenum oxide on alumina catalysts in accordance with the fluidized solids technique in which the molybdenum content of the catalyst is maintained substantially constant.

These and other objects will appear more clearly from the detailed specification and claims which follow.

An intensive investigation of the molybdenum loss problem has shown that the loss of molybdenum oxide from the catalyst is not associated with attrition of the catalyst particles or to carryover with the hydroformate product but is due to vaporization of the $MoO_3$ from the catalyst at ordinary regenerator temperatures of about 1050° F. and higher. It has been found that molybdenum oxide loss from fluid hydroforming catalysts can be prevented by cooling or quenching the regenerator disperse phase to temperatures below about 1000° F. and preferably below 800° F. The quenching or cooling of the regenerator disperse phase can be accomplished by numerous techniques such as (1) by injecting a water spray at the top of the dilute phase or (2) by quenching with fluid solids which are passed through an external cooler or by introducing unregenerated catalyst from the reactor into the dilute phase or (3) by arranging cooling coils in the disperse phase or between cyclone stages with water or other suitable heat exchange fluid serving to carry away the heat.

Referring to the accompanying drawing illustrating a diagrammatic flow plan of this invention, the reactor vessel 10 is charged with finely divided, fluidizable hydroforming catalyst comprising molybdenum oxide upon an alumina support. Hot recycle gas is supplied to the reactor through the inlet line 11 and preheated naphtha feed is supplied through inlet line 12 to suitable distributor means within the reactor. If desired, the naphtha and the recycle gas may be supplied through a single inlet line to suitable distributor means within the reactor. In view of the fact that the recycle gas is ordinarily preheated to temperatures of about 1100–1150° F. while the naphtha can not be preheated above about 975–1000° F. without danger of thermal degradation or cracking of the naphtha, it is essential to keep the time of contact of naphtha and recycle gas in the inlet line and distributors as short as possible to minimize thermal cracking.

Gas velocities through the reactor vessel are controlled to between about 0.3 to 1.5 feet per second in order to form a dense, fluidized bed 13 having a definite level L or interface separating it from a dilute or disperse phase 14 comprising small amounts of catalyst entrained in the vaporous reaction products in the upper part of the reactor vessel. The reaction product pass overhead from the reactor dense bed 13 through a cyclone separator 15 or the like which serves to separate entrained catalyst from the product vapors. The separated catalyst is returned to the reactor dense bed through dip-legs attached to the bottom of the cyclone separators. Reaction products substantially free of catalyst are removed through products outlet line 16 to suitable product recovery, stabilizing and/or storage equipment.

Suitable catalysts for charging to the reactor comprise from about 3 to 15 and preferably about 10 weight percent of molybdenum oxide upon an lumina support. The alumina support may be activated alumina, alumina gel or the like, preferably having a surface area of at least about 100 square meters per gram. The alumina may contain small amounts such as about 1 to 6 weight percent of silica as a stabilizer. The catalyst should, for proper fluidization, be between 80 and 400 mesh or about 10 to 200 microns in diameter with a major proportion between about 20 and 100 microns.

Carbonaceous deposits are formed on the catalyst particles during the hydroforming reaction and it is necessary to continuously withdraw catalyst from the reactor for regeneration. A catalyst withdrawal well 17 is arranged within the reactor having its upper, open end extending above the dense bed level L. An opening or inlet port 18 is provided in the wall of the withdrawal well for the passage or discharge of catalyst from the dense bed 13 into the withdrawal well. Stripping gas such as steam or an inert gas such as methane or nitrogen is supplied to the lower part of the withdrawal well through inlet line 19 in order to strip out entrained or adsorbed vaporous reactants from the catalyst particles. The stripping gas and materials stripped from the catalyst are discharged through the upper open end of the withdrawal well into the dilute phase 14 in the upper part of the reactor. Stripped catalyst is discharged from the bottom of the withdrawal well 17 into standpipe 20 and through slide valve 21 or other suitable flow control means into transfer line 22. Lift gas, which is preferably part of the air necessary for regeneration is supplied through line 23 and serves to carry the catalyst discharged from standpipe 20 through transfer line 22 into regenerator 25. In view of the rapidity with which the carbonaceous deposits are burned from the catalysts at system pressures, it is preferable to use only part of the air necessary for regeneration to convey the catalyst through line 22 into the regenerator 25 and to supply the remainder of the air necessary for regeneration directly to the regenerator through inlet line 26 and suitable rings or spiders within the regenerator for uniformly distributing the regeneration air.

The velocity of the air through the regenerator vessel 25 is controlled to form a dense, fluidized bed 27 of catalyst in regeneration gas having a definite level $L^1$. Regenerated catalyst is withdrawn from the dense bed 27 by providing a withdrawal well 28 having its upper, open end above the dense bed level $L^1$ and having an inlet port or opening 29 near the upper part of dense bed 27 for the withdrawal of catalyst from the dense bed into the well. Stripping gas such as steam or scrubbed flue gas may be supplied to the lower part of withdrawal well 28 through inlet line 30 in order to strip off any residual regeneration gas entrained with the catalyst. The stripped regenerated catalyst is discharged from the base of the withdrawal well 28 into transfer line 31 provided with slide valve 32 or other suitable flow control means for passage or recycling into the reactor vessel. The regenerated catalyst may be given a brief or limited reduction in the transfer line 31 by introducing a small amount of hydrogen or other suitable reducing gas as through inlet line 33 or it may be discharged without contact with hydrogen or other reducing gas into the reactor dense bed. If the regenerated catalyst is contacted with hydrogen-containing gas in transfer line 31 the hydrogen treatment should be sufficient only to reduce the $MoO_3$ in the catalyst to $Mo_2O_5$ or to $MoO_2$ or mixtures of these compounds. If hydrogen is supplied to transfer line 31 it is preferable also to supply a relatively large volume of diluent gas in order to strip water formed as a by-product in the reduction off of the catalyst.

The regeneration gases pass overhead from dense bed 27 entraining small amounts of catalyst forming a dilute or disperse phase 34 in the upper part of the regenerator vessel. Moreover, at ordinary regenerator temperatures of 1050–1150° F. and due to the stripping action of the regeneration gases substantial quantities of molybdenum oxide are vaporized or stripped from the catalyst undergoing regeneration. In accordance with the present invention, the regeneration gases are quenched to a temperature below about 1000° F. preferably within the upper part of the regenerator itself where there will be present sufficient catalyst fines to catch and to hold the molybdenum oxide vapors. The drawing illustrates one simple method of effecting the quenching of the regeneration gases, that is by supplying water through line 35 to one or more spray nozzles arranged in the upper part of the regenerator vessel. Instead of the water sprays, cooling coils can be mounted in the disperse phase 34 and a suitable coolant such as water or, if desired, a feed stream for the reactor can be passed therethrough in order to preheat the same. Quenching also could be effected by introducing relatively cool reactor catalyst into the disperse phase or, a stream of regenerator catalyst could be withdrawn from the regenerator dense bed, cooled as by indirect heat exchange with a suitable coolant and discharged into the dilute or disperse phase 34 in the regenerator. The quenched regeneration gases are withdrawn from the regenerator vessel through cyclone separators 37 or the like which serve to separate the major proportion of the entrained catalyst which is somewhat enriched in molybdenum oxide content due to the quenching of the regeneration gases. The catalyst removed from the regeneration gases is returned to the regenerator dense bed through the diplegs attached to the cyclone separators and the regeneration gases, substantially free of catalyst are discharged through outlet line 38 to a turbine or other suitable pressure releasing equipment and to a waste heat boiler or stack or, if the flue gases are to be used for stripping or as lift gas in the process then to suitable scrubbing and storage equipment.

The feed or charging stock to the reactor 10 may be a virgin-, cracked- (thermal or catalytic) or Fischer-Tropsch naphtha or the like or mixtures of two or more of these naphthas having a boiling range of from about 125 to 450° F., or it may be a narrow boiling cut from within this range. The feed stock is preheated to about reaction temperature and supplied to the reaction zone. Recycle gas is preheated to temperatures of up to about 1200° F. and introduced or circulated through the reaction zone at rates of from about 500 to 6000 cu. feet per barrel of naphtha feed.

The hydroforming reactor vessel is operated at about 850–1000° F., preferably at about 900–950° F., and at pressures of about 50–1000 lbs. per square inch gauge. It is desirable to maintain a water partial pressure of about 0.1 to 3.0 mol percent in the reaction zone.

The regenerator is operated at essentially the same pressure as the hydroformer reactor vessel in order to facilitate the transfer or flow of catalyst between these vessels. Regenerator dense bed temperatures are within the range of from 1050 to 1200° F. The average residence time of the catalyst in the reactor vessel is of the order of from about 1 to 4 hours and in the regenerator vessel of from about 3 to 60 minutes. The preferred exit temperature of the regeneration gases is 800–1000° F.

The weight ratio of catalyst to oil introduced into the reactor 10 should ordinarily be about 0.5 to 3.5. Space velocities or the weight in pounds of feed charged per hour per pound of catalyst in the reactor depends upon the age and activity level of the catalyst, the character of the feed stock and the desired octane number of the product. Space velocity may vary, for example, from about 1.5 to about 0.15 w./hr./w.

*Example*

A Louisiana-Mississippi virgin naphtha having a boiling range of 200–325° F. is hydroformed in a fluidized solids reactor system charged with a catalyst comprising 9.7 weight percent molybdic oxide upon an activated alumina containing about 2.0 weight percent silica. The reactor vessel is maintained at 935° F. and at a pressure of 200 p.s.i.g. The catalyst to oil ratio is about 1.0 and the space velocity is that required for the desired octane. The recycle gas charging rate is 5000 s.c.f./b. Catalyst holding time in the reactor is 2 hours.

Catalyst is continuously withdrawn from the reactor and charged to a regenerator where carbonaceous deposits are burned off at about 1050° F. and at system pressure. The holding time of the catalyst in the regenerator is approximately 7 minutes.

The following data show the molybdenum oxide loss and the fact that the loss is by vaporization in the regenerator and not by attrition:

| Circulating catalyst: | Molybdic oxide content, wt. percent |
|---|---|
| Total sample | 9.7 |
| 0–20 micron fraction | 9.7 |
| Reactor overhead sample: 0–20 micron fraction | 10.5 |
| Regenerator overhead sample: 0–20 micron fraction | 30.5 |

By injecting water sprays into the regenerator disperse phase sufficient to lower the disperse phase to about 925° F., it is possible to avoid this excessive molybdic oxide loss.

The foregoing description contains a limited number of embodiments of this invention. It will be understood, however, that this invention is not limited thereto since numerous variations are possible without departing from the scope of this invention.

What is claimed is:

1. In a method of hydroforming hydrocarbon fractions boiling within the motor gasoline boiling range in contact with a molybdenum oxide on alumina catalyst in a fluidized solids system in which catalyst is continuously circulated between a dense, fluid bed in a reaction zone maintained at active hydroforming conditions of temperature and pressure and a dense fluidized bed in a regeneration zone maintained at essentially the same pressure as is maintained in the hydroforming reaction zone, the improvement which comprises passing oxygen containing gas through the dense fluidized bed in the regeneration zone to burn carbonaceous deposits from the catalyst at temperatures of about 1050–1200° F. and quenching the regeneration gases in the dilute phase in the upper part of the regeneration zone to below about 1000 F. in order to recover molybdenum oxide vaporized during the regeneration of the catalyst.

2. The method as defined in claim 1 in which water sprays are injected to lower dilute phase temperatures.

3. The method as defined in claim 1 in which regenerator dilute phase temperature is lowered by indirect heat exchange with a suitable coolant.

4. The method as defined in claim 1 in which cooling of the regenerator dilute phase is effected by injecting cool catalyst therein.

References Cited in the file of this patent

UNITED STATES PATENTS

| | | |
|---|---|---|
| 2,355,831 | Voorhees | Aug. 15, 1944 |
| 2,451,573 | Meyers et al. | Oct. 19, 1948 |
| 2,454,373 | Blanding | Nov. 23, 1948 |